United States Patent [19]

Kemmerer, Jr.

[11] Patent Number: 4,508,306

[45] Date of Patent: Apr. 2, 1985

[54] COMPUTER READ-OUT BOOK STAND

[76] Inventor: Kermit H. Kemmerer, Jr., R.D. #1, Box 1049, Stroudsburg, Pa. 18360

[21] Appl. No.: 542,745

[22] Filed: Oct. 17, 1983

[51] Int. Cl.³ .............................................. F16M 13/00
[52] U.S. Cl. .................................... 248/454; 248/460
[58] Field of Search .................. 248/441.1, 447, 447.1, 248/447.2, 442.2, 446, 448, 449, 450, 451, 454, 455, 456, 457, 460, 463, 465

[56] References Cited

U.S. PATENT DOCUMENTS

| 1,841,153 | 1/1932 | Racz | 248/453 |
| 1,915,138 | 6/1933 | Unger | 248/441.1 X |
| 1,938,528 | 12/1933 | Marseglia | 248/454 X |
| 3,376,009 | 4/1968 | Domino | 248/460 X |
| 3,508,803 | 4/1970 | Redick | 248/447 X |
| 3,743,231 | 7/1973 | Whyte | 248/452 |
| 3,836,108 | 9/1974 | Surette | 248/452 |
| 4,128,176 | 12/1978 | Green | 248/460 X |
| 4,436,271 | 3/1984 | Manso | 248/460 |

Primary Examiner—J. Franklin Foss
Attorney, Agent, or Firm—Ruth Moyerman

[57] ABSTRACT

A computer read-out book stand is disclosed. The stand has a rectangular base with a rectangular book support adjustably attached at the base's midpoint. The book support is angularly elevated by a set of elevators of graduated heights. A retaining means on the book support's distal end connects a selected elevator to the book support. L-shaped posts fastened to the book support, and parallel to its sides, receive the slotted ends of book spine holders so that the book remains in place, resting on the book support at the desired angle.

11 Claims, 10 Drawing Figures

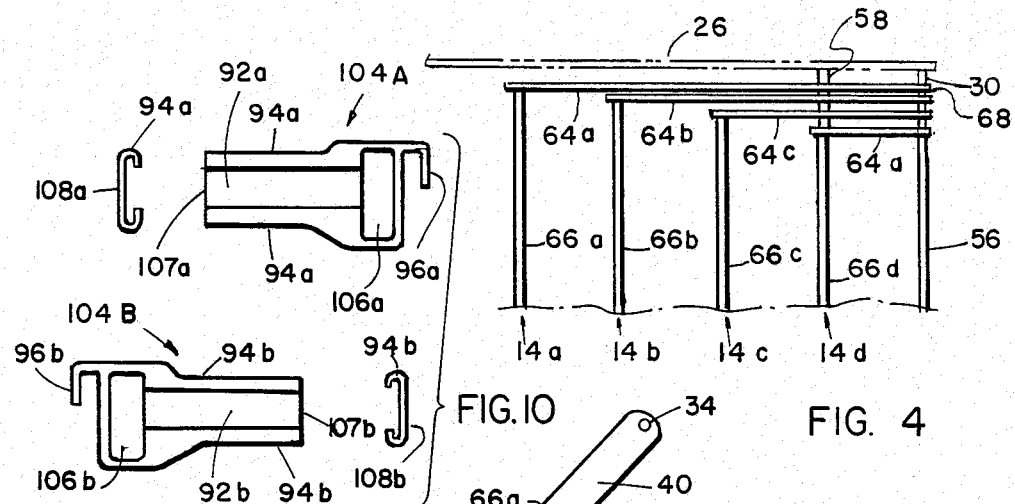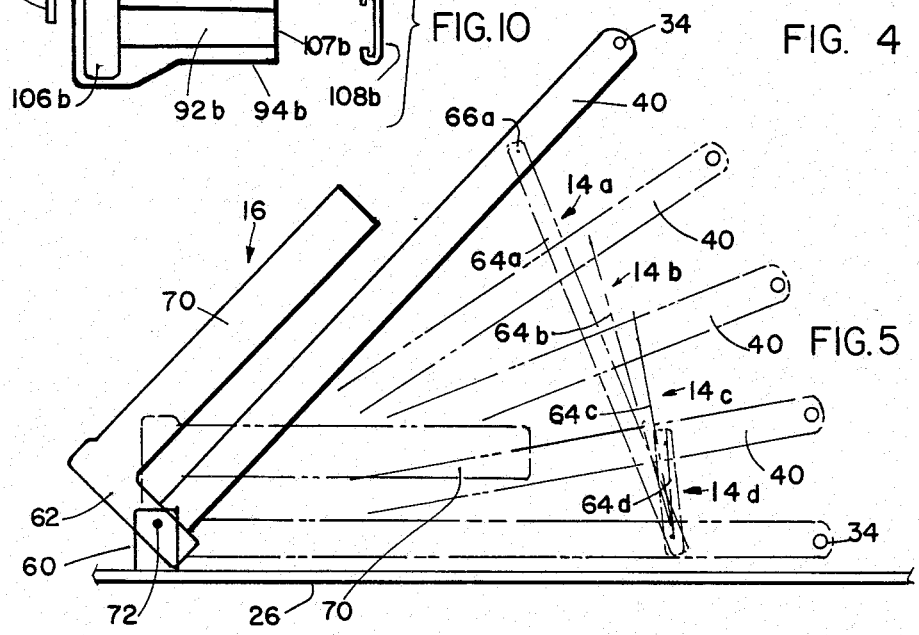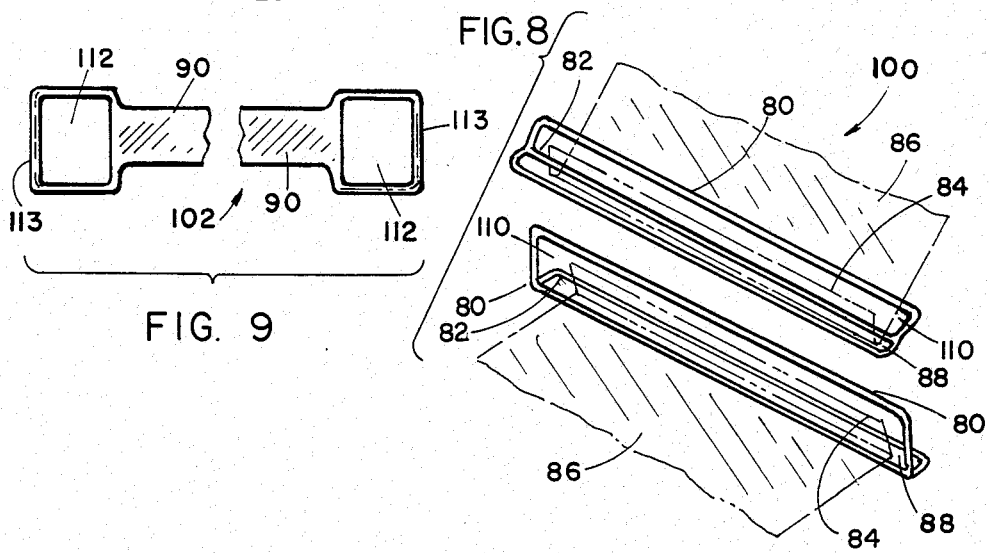

COMPUTER READ-OUT BOOK STAND

BACKGROUND OF THE INVENTION

1. Field of the Invention

This invention relates to a support stand, and more particularly to a stand for holding, in the open position, a computer read-out book.

2. Description of the Prior Art

In recent years, the increased use of computers in small and large businesses has led to a need for a desk top stand to hold computer read-out books in position for use.

Several devices are known that are desk size and support a book. U.S. Pat. No. 3,686,780 to Sheehan discloses a tilted rack to hold loose-leaf binders. Mounting devices are fitted on the binders and the support may be tilted for access to the binders. Sheehan's device holds several volumes at one time and requires tilting of the entire rack to provide access to the desired pages.

U.S. Pat. No. 4,156,513 to Rich shows an upwardly inclined rack with rear support legs. An arm is attached to one side to hold the binder open to the desired page. Rich's device requires an arm to hold pages open for use.

U.S. Pat. No. 3,836,108 to Surette discloses an A-shaped framework with a transverse bar across its top to hold a binder book on the stand. Surette's rack provides access to the lower pages only, and requires insertion of the spine holder each time a book is used.

There is, therefore, a great need for a desk sized computer read-out book stand that is readily adjustable, holds a book open for use, and on which a new book may be quickly and easily placed.

SUMMARY OF THE INVENTION

The aforementioned prior art problems are obviated by the device of this invention in which a computer read-out book is firmly held in place at a prechosen angle for easy use. The stand includes a preferably rectangular base with a preferably rectangular book support adjustably attached to the base's sides at their midpoints. Rotatably attached to the distal end of the base are a set of elevators of graduated heights. Attached to the distal end of the book support is a spring-activated retaining bar which hooks onto a chosen elevator, supporting the computer read-out book at a chosen angle.

Parallel to the sides of the book support, and attached as an extension of the support's sides, are L-shaped posts. These posts receive the slotted ends of book spine holders. These holders are placed inside the computer read-out book spine with the slotted end extending out of the book. The slotted ends overfit the posts, and the book is held firmly on the stand.

It is, therefore, an object of this invention to provide a computer read-out book stand which is easily adjustable to a variety of angles for convenience of use.

It is another object of this invention to provide a computer read-out book stand which may employ a variety of book spine holders.

It is still another object of this invention to provide book spine holders that may be permanently placed in a book.

It is yet another object of this invention to provide a book spine holder which may, additionally, be used to hang a book for storage.

It is a further object of this invention to provide a non-permanent, universal book spine holder that will fit in a variety of models of binder books and may be quickly inserted or removed so that one set may be used for several books.

It is a further object of this invention to accomplish the aforementioned objects while using a mounting method which offers restraint to the opening of the book, thus reducing the tendency of the pages to tear out of the book assembly.

These and other objects will be more readily ascertainable to one skilled in the art from a consideration of the following Figures, description and exemplary embodiments.

BRIEF DESCRIPTION OF THE DRAWING(S)

FIG. 4 is a partial top view of the elevators in the collapsed position, the book support removed.

FIG. 5 is a side view of the invention showing a post and elevator in raised position and four alternative elevator positions in phantom.

FIG. 8 depicts a first set of book spine holders in a computer read-out book binder cover.

FIG. 9 is a top view of an alternative embodiment of the book spine holder.

FIG. 10 is a top view of a third embodiment of a set of spine holders including partial front view of the end of A and B.

DETAILED DESCRIPTION OF THE PREFERRED EMBODIMENT(S)

Figure 1:
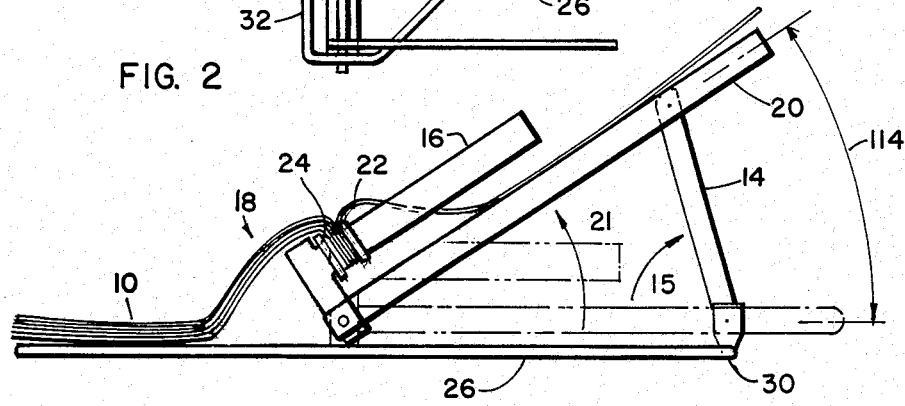
FIG. 1 is a side view of the device of this invention showing a book in place.

Referring now to the drawings, and more particularly to FIG. 1, open book 10 is shown resting on book support 20 of computer read-out stand 18. Elevator 14 is being used to hold book support 20 at the angle shown. Post 16 is shown overfitted by ends 22 of spine holders 24 as will be described in more detail in reference to FIGS. 8, 9 and 10. Side 26 of base 12 and distal end 30 are also shown, providing a steady base for stand 18.

FIG. 1 depicts the angular nature of computer read-out book stand 18, showing one angle obtainable for easy access to pages of book 10. It can be seen in FIG. 1 that book 10 is firmly held on posts 16 and will not slide off stand 18 even though book 10 is held at about a 44 degree angle on stand 18, shown by angle 114.

FIG. 1 also shows directional arrows 15 and 21. Arrow 21 indicates the direction in which book support 20 is raised when it supports a book 10. Directional arrow 15 indicates the direction in which elevators 14 are raised to hold book support 20 at a desired angle.

Figure 2:
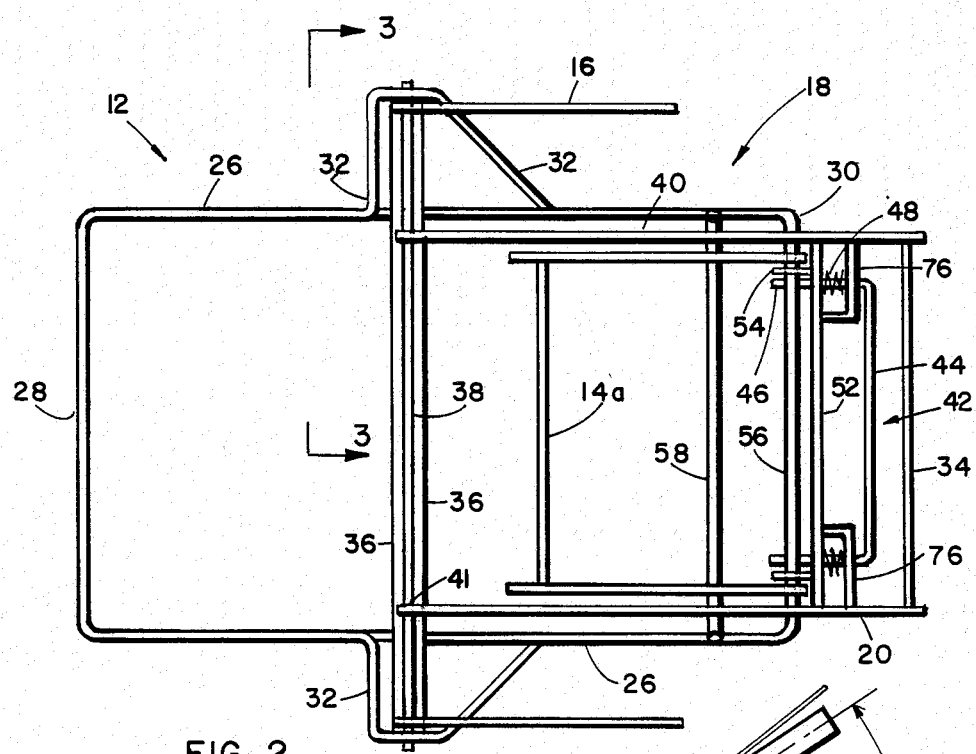
FIG. 2 is a top view of the device of this invention with some book elevators and the book removed.

Referring now to FIG. 2, a top view of stand 18 depicts the stand as it would appear collapsed. In FIG. 2, elevators 14B, C and D are omitted to better show base 12. Base 12 is shown having sides 26, proximal end 28 and distal end 30. Angular extensions 32 of sides 26 provide additional support for book support 20 and posts 16, the latter being shown more clearly in FIG. 3.

Book support 20 is seen in its lowered, or collapsed, position in FIG. 2. This lowered position allows for compact storage of stand 18 when it is not in use. Book support 20 is seen having distal end 34, proximal end 36, bar 38 and sides 40. Bar 38 is attached to sides 40 at points 41. Bar 38 also serves as a means of attaching book support 20 to base 12, shown better in FIG. 3.

Also shown in FIG. 2 is retaining means 42. Retaining means 42 includes U-shaped bar 44 having legs 46. Legs 46 are partially circumsribed by springs 48. Legs 46 extend through apertures (not shown) in crossbar 52. Hooks 54 latch onto end bar 56 of elevator 14A.

In FIG. 2, bar 56 partially hides distal end 30 of base 12. Bar 56 receives hook 54 to act as a lock, firmly holding book support 20 flat for storage. Also seen is L-shaped brace 76 of retaining means 42, brace 76 connecting book support sides 40 to crossbar 52. Retaining means 42 is also used to hold elevators 14 (A, B, C and D not shown) in position when stand 18 is in use. This use is better seen in FIGS. 6 and 7.

Also seen in FIG. 2 is stop bar 58. When elevators 14 are collapsed, they rest on stop bar 58. Stop bar 58 prevents elevators 14 from falling onto the desk surface and also helps keep stand 18 neatly together for storage.

Figure 3:
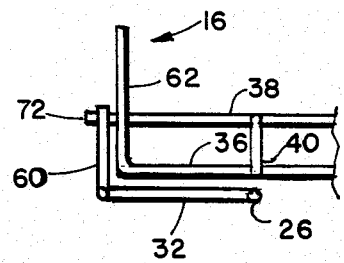
FIG. 3 is a cross section taken along lines 3—3 of FIG. 2.

Referring now to FIG. 3, a fragmented cross section of base 12 taken on lines 3—3 of FIG. 2 shows one of side 26's extensions 32, and leg 62 of post 16. Extension 32 of side 26 is shown including a support piece 60. Support piece 60 has an aperture (not shown) to receive end 72 of bar 38. Additionally, bar 38 extends through short leg 62 of post 16 to which it is permanently secured. Bar 38 is also permanently secured at point 41 seen in FIG. 2 to sides 40 of book support 20. Thus, bar 38 rotates freely in support piece 60 while post 16 and book support 20 move always in their fixed positions relative to each other, held in that position by bar 38 and proximal end 36 of support 20.

It is also seen that short leg 62 of post 16 is an integral part of proximal end 36 of book support 20. Thus, book support 20 and post 16 will always be in the same fixed positions relative to each other.

Referring now to FIG. 4, a partial enlargement of FIG. 2 shows elevators 14 in their lowered position on stand 18. Each elevator 14 is a U-shape having legs 64 and bight 66. In this view, only a part of each elevator 14 is shown, but elevator 14 is symetrical and the unseen portion is the same to that shown. Leg 64A extends to, and is permanently secured to, bar 56 at ends 68 of bar 56 so that elevator 14A actually forms a rectangle with bar 56. Legs 64B, 64C and 64D contain apertures to receive bar 56, so that bar 56 extends through all legs 64 and is fastened to legs 64A. Bar 56 rotates when elevator 14A is moved, but remains stationary when elevators 14B, 14C and 14D are moved. Thus, bar 56 acts as a base for all elevators, holding their leg ends in place.

FIG. 4 also shows the graduated sizes of elevators 14. Elevator 14A is the largest of elevators 14 and elevators 14B, 14C and 14D are progressively smaller. The importance of this size graduation is shown and explained in reference to FIG. 5.

Also seen in FIG. 4 are sides 26 of base 12. Distal end 30 of base 12 is partially visible in FIG. 4, but most of distal end 30 is hidden by bar 56. Stop bar 58 is seen in FIG. 4. Legs 64A, 64B, 64C and 64D all rest on stop bar 58. Thus, stop bar 58 prevents elevators 14 from dropping below base 12 and hitting the desk surface.

Referring now to FIG. 5, a side view of the invention, elevators 14 are shown holding book support 20 at various angles. Elevators 14 have been raised in the direction indicated by arrow 15 in FIG. 1. Elevator 14A is seen with leg 64A in the upright position. Post 16, having short leg 62 and upright 70, is shown in parallel position to book support sides 40. In this position, using elevator 14A, the angle formed by the opposing pages of book 10 (not shown) would be most appropriate when few pages were in the part of book 10 resting on book support 20. As smaller elevators 14 are employed, it would be possible for more pages of book 10 to be in the upper position because the decreasing angularity would prevent the pages from flipping down onto the portion of book 10 which rests on proximal end 28 (not shown) of base 12.

Also shown in FIG. 5 is side 26 of base 12. Attached to side 26 by extension 32 (refer to FIG. 3) is support piece 60. End 72 of bar 38 is shown rotatably mounted in an aperture (not shown) of support piece 60. Bar 38 also extends through short leg 62 of post 16, and leg 62 is permanently fastened in position on bar 38 as explained in FIG. 3. Sides 40 of book support 20 are also permanently secured in the position shown on bar 38. Thus, upright 70, permanently attached to leg 62 of post 16, moves in parallel position to sides 40 of book support 20. Also seen are distal end 34 of book support 20 and crossbar 66A of elevator 14A.

Figure 6:
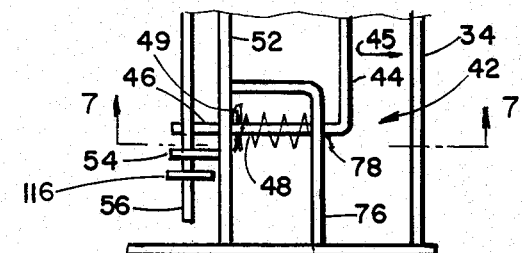
FIG. 6 is a fragmentary enlargement taken of FIG. 2.

Now referring to FIG. 6, it may be seen how elevators 14 are held in their upright position by showing an enlargement of retaining means 42 taken from FIG. 2. In FIG. 6, retaining means 42 is holding bar 56, the end bar of elevator 14A. This position is seen when book support stand 20 is collapsed for carrying or storage.

In operation, bar 44 of retaining means 42 is pulled in the direction of arrow 45 towards book support distal end 34. Compressing spring 48 urges legs 46 towards crossbar 52, freeing bar 56 from hook 54. An elevator 14 of the desired height is chosen and raised. Bar 44 is then released so that legs 46 are extended on one side of bight 66 of an elevator 14 and the closed end of hook 54 surrounds the other sides of bight 66, holding the chosen elevator 14 in its upright position.

Also shown in FIG. 6 is L-shaped brace 76, fastened by one leg to book support side 40 and by its other leg to crossbar 52 of retaining means 42. Brace 76 includes an aperture 78 to receive and hold leg 46 of U-bar 44. Thus, L-shaped brace 76 has a dual function—it serves as a guide for leg 46 of U-bar 44 and also reinforces bars 40 and 52. Pressure fro spring 48 holds leg 46 in position when bar 44 is released. When bar 44 is pulled toward distal end 34, legs 46 are prevented from being pulled completely through bar 52 by spring stop 49.

Figure 7:
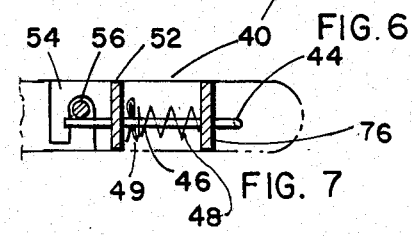
FIG. 7 is a cross section taken along lines 7—7 of FIG. 6.

Now referring to FIG. 7, a cross section of FIG. 6 taken along lines 7—7 is shown. In FIG. 7, it is seen how hook 54 and leg 46 hold bar 56. Hook 54 surrounds bar 56 on three sides and keeps bar 56 steady. Leg 46 prevents bar 56 from falling out of hook 52 on its free side. Leg 46 is most important when a bight 66 is retained by retaining means 42 as explained in FIG. 6. Then, leg 46 adds in supporting bight 66, preventing elevator 14 from falling into its collapsed position.

Also seen in FIG. 7 is book support side 40 to which bar 52 is attached. Crossbar 44 of retaining means 42 is also seen attached to leg 46. Surrounding leg 46 is spring 48 with its stop 49. Also seen is brace 76. Thus, in FIGS. 6 and 7 we see how retaining means 42 on book support 20 is used to hold selected elevator 14 in positions.

Now referring to FIG. 8, a first embodiment of spine holders 24 is shown. A continuous rod 80 forms an elongated rectangle to form slot 110 of spine holder 100. A second rod 82 is joined at rod 80's ends to form slot 88. Elongated slot 88 is sized to closely overfit spine 84 of book cover 86 and hold spine 84. Slot 110 is sized to slidably mount upright 70 of posts 16 (shown in FIG. 5).

Spine holders 100 are easily removable and need not be permanently inserted in book 10. Slots 110 provide for easy insertion onto post 16, and slots 88 are sized for speedy insertion into a book 10. Spine holders 100 are used as a set, one on each cover 86 with pages (not shown) of book 10 placed between covers 86.

FIG. 9 shows a second embodiment of spine holder 24. Spine holder 102 is a continuous flat bar 90 which has slots 112 formed by end 113. Two or more spine holders 102 may be in book 10. The number being used will be determined by the size of book 10. Bar 90 is placed inside book 10 (not shown) as close to the spine as possible. In a large book, three holders 102 might be employed, one near each cover 86 and one inside the pages. After insertion in a book 10, all slots 112 are fitted over upright 70 of post 16 (shown in FIG. 5) to hold book 10 on stand 18.

Referring now to FIG. 10, a third embodiment of book spine holders 24 is shown. Spine holders 104A and 104B are used with a predetermined book binder. In spine holder 104A, slot 92A, formed by shoulders 94A, is sized to receive a track in a preselected binder spine. Spine holder 104A is pushed onto one end of a track of a binder and is firmly held there. Spine holder 104B is then pushed onto the opposite end of the binder track. When a book containing book spine holders 104 is used, slots 106A and 106B slidably overfit upright 70 of post 16 (shown in FIG. 5) and hold book 10 (shown in FIG. 1) on stand 18.

Book spine holders 104A and 104B are used as a set, one on each end of a track in a book spine. Thus, book spine holder 104B also has slot 92B formed by shoulders 94B and slot 106B to overfit a post 16.

Also shown in FIG. 10 are cross sections 108A and 108B of end 107A and 107B of book spine holders 104A and 104B. Cross sections 108A and 108B show the curved nature of shoulders 94A and 94B. The curving shoulders of 94A and 94B grip the edges of a track in a book spine and hold book spine holders 104 in place on the book.

Book spine holders 104 also include hooks 96. Hooks 96 are employed when a book containing spine holders 104 is not being used on stand 18. Hooks 96 are used to suspend book 10 (not shown) in a preselected storage cabinet which contains rods for hanging such books.

There are three embodiments of spine holder 24 illustrated, however, any holder which would support a book and overfit posts 16 is within the scope of this invention.

Four elevators 14 have been illustrated, but any number of elevators would be within the scope of this invention.

Retaining means 42 employs spring 48 but any adjustable retaining means would be within the scope of this invention.

Although spring stop 49 is shown as a cotter pin, any suitble stop which would achieve the same purpose is within the scope of this invention.

Although base 12 and book support 20 have been discussed as being constructed of bars, a sheet metal or solid plastic form would also be covered under such a description.

There are many advantages to the device of this invention. Chiefly, it provides the user with a stand capable of angular adjustment to several support angles. Additionally, book 10 does not have to be removed from stand 18 to adjust its angle of support.

Secondly, the spine holders of this invention provide great versatility for the user. He may employ spine holder 104 in combination with a predetermined storage system and predetermined binders. He may use spine holders 102 for permanent or temporary use, employing one set of holders on different binder books. He may also use spine holders 100 for easy insertion and removal.

Having now illustrated and described my invention, it is not intended that such description limit this invention, but rather that the invention be limited only by a reasonable interpretation of the apended claims.

What is claimed is:

1. A computer read-out stand comprising:
   (a) a generally rectangular base having a proximal end, a distal end and longitudinally extended sides connecting said ends, said sides including triangular extensions to receive a book support;
   (b) a generally rectangular adjustable book support having proximal and distal ends and longitudinal sides, said book support movably connected on its proximal end to said base's longitudinal sides proximate said sides' midpoints, said support including a bar attached at its ends, one each to each of said longitudinal sides and parallel to and approximate said proximal end;
   (c) at least one U-shaped book support elevator, each of said elevators' legs being rotatably attached to said base's distal end by a bar across open end of largest of said elevators, said elevators' bights being adapted to removably fit in a retaining means;
   (d) retaining means on said book support's distal end to receive and hold a bight of one of said elevators in position for use;
   (e) a pair of L-shaped posts attached to said book support, said posts' upright arms extending parallel to said book support's longitudinal sides, and said L's short arms attached at their ends to said support end and side intersections, so that said L's short arms form extensions of said support edges to provide receiving means for book spine holders;
   (f) at least one book spine holder adapted to slidably mount on said posts,
   whereby, when said retaining means is engaged, said book spine holder may be inserted into a book spine, and said holder may be slidably overfitted onto said posts, thereby supporting said book at a predetermined angle.

2. The computer read-out stand according to claim 1 wherein said book spine holder includes slots at its ends sized to slidably overfit said L-shaped posts on said rack.

3. The book spine holder according to claim 1 wherein said holder comprises:
   (a) a flat bar pre-sized to extend slightly beyond the edges of a computer read-out book when said bar is placed inside said book proximate said spine of said book;
   (b) apertures proximate both ends of said bar to receive a binding cord of said book; and,
   (c) a pair of generally O-shaped extensions, one on each of said bar ends to slidably overfit said posts on said rack.

4. The book spine holder according to claim 1 wherein said holder comprises a first continuous rod forming an elongated rectangle, said rectangle being pre-sized lengthwise to overfit a cover of said book and sized transversely to slidably overfit said L-shaped posts, one elongated side of said rectangle having an additional second rod joined to its ends, said second rod running parallel to said side and forming a book cover-receiving slot with said side.

5. The book spine holder according to claim 1 wherein said holder comprises a pair of grooved latches, each sized at one end to slidably receive a track end of a predetermined binder book, said latches other end including a slot sized to slidably overfit said L-shaped post, said other end also including a hook so that when said latches are inserted into opposite ends of a binder book track, said book may be either fitted onto said stand or hung from said hooks.

6. The retaining means according to claim 1 wherein said means comprises:
(a') a crossbar connecting said longitudinal sides of said book support, said crossbar located proximate said distal end of said book support and including apertures, one each proximate each of said crossbar's ends;
(b') a pair of L-shaped braces, a first leg of each of said L attached to each of said book support's longitudinal sides between said crossbar and said book support's distal end, the other leg being attached to said retaining mean's crossbar between said aperture and said retaining mean's crossbar's midpoint, each of said first legs including an aperture aligned with said crossbar's aperture;
(c') a U-shaped bar sized to fit through said retaining mean's crossbar's apertures and said brace's first leg's apertures, and having extended legs and a crosspiece joining said legs;
(d') a spring circumscribing each of said U-bar's legs between said L-shaped brace and said retaining mean's crossbar, said spring including a movable spring stop at its end proximate said crossbar; and,
(e') hooks attached to said retaining mean's crossbar, sized to overfit and retain said elevator's bight,
so that when said elevator is raised, said elevator's bight is held in position by said hook and said extended legs of said retaining means U-shaped bar.

7. The book support elevators according to claim 1 wherein there are a plurality of elevators of graduated heights to provide angular elevation to said book support.

8. The computer read-out stand according to claim 1 wherein said base is constructed of cylindrical bars.

9. The book support elevator according to claim 1 wherein said elevators are cylindrical bars.

10. The posts according to claim 1 wherein said posts are flat bars.

11. The computer read-out stand according to claim 1 which includes, additionally, a bar parallel to and proximate said base's distal end, and fastened to said base's longitudinal side which acts as a stop for said elevators when said elevators are not in use.

* * * * *